(12) United States Patent
Wechsler

(10) Patent No.: US 12,591,923 B2
(45) Date of Patent: Mar. 31, 2026

(54) AUGMENTED REALITY SHOPPING SYSTEM

(71) Applicant: Ivanta Styling, Egg Harbor Township, NJ (US)

(72) Inventor: Aaron Wechsler, Egg Harbor Township, NJ (US)

(73) Assignee: Ivanta Styling, Egg Harbor Township, NJ (US)

( * ) Notice: Subject to any disclaimer, the term of this patent is extended or adjusted under 35 U.S.C. 154(b) by 183 days.

(21) Appl. No.: 18/466,309

(22) Filed: Sep. 13, 2023

(65) Prior Publication Data

US 2025/0086690 A1 Mar. 13, 2025

(51) Int. Cl.
*G06Q 30/0601* (2023.01)
*G06F 21/31* (2013.01)

(52) U.S. Cl.
CPC ......... *G06Q 30/0635* (2013.01); *G06F 21/31* (2013.01); *G06Q 30/0609* (2013.01)

(58) Field of Classification Search
CPC ..... G06Q 30/00; G06Q 30/0609; G06F 21/31
See application file for complete search history.

(56) References Cited

U.S. PATENT DOCUMENTS

| | | | |
|---|---|---|---|
| 10,052,552 B2 | 8/2018 | Worrall et al. | |
| 10,387,912 B2 * | 8/2019 | Farshori | G06Q 30/0253 |
| 10,481,758 B2 * | 11/2019 | Cowles | G06F 3/04845 |

| | | | |
|---|---|---|---|
| 10,580,026 B2 * | 3/2020 | Levy | G06Q 20/201 |
| 10,692,297 B2 | 6/2020 | Duan et al. | |
| 10,824,987 B2 * | 11/2020 | Kliper | G06N 7/01 |
| 10,896,551 B2 | 1/2021 | Duan et al. | |
| 10,943,288 B2 * | 3/2021 | Li | G06N 20/00 |
| 11,164,227 B2 * | 11/2021 | Kaehler | G06Q 30/0629 |
| 11,321,768 B2 * | 5/2022 | Beauchamp | G06Q 30/0601 |
| 11,354,679 B1 * | 6/2022 | Morgan | G06Q 30/0185 |
| 11,842,385 B2 * | 12/2023 | Beauchamp | G06T 19/20 |

(Continued)

FOREIGN PATENT DOCUMENTS

| | | |
|---|---|---|
| CA | 3012211 A1 | 1/2019 |
| CN | 111724166 A | 9/2020 |

(Continued)

*Primary Examiner* — Oluseye Iwarere

(74) *Attorney, Agent, or Firm* — Briggs IP; Jeremy A. Briggs

(57) ABSTRACT

An Augment Reality (AR) shopping method to facilitate shopping of limited edition products is described. The method may include obtaining a target location of a virtual object disposed in a geographical area from a distributer user device. The method may further include obtaining a trigger signal from the distributer user device, and determining a customer user device authenticity responsive to obtaining the trigger signal. Further, the method may include transmitting a virtual map including the target location to the customer user device. Furthermore, the method may include navigating the customer user device to the target location, and determining that the customer user device may have reached the target location. The method may further include transmitting a product purchase link to the customer user device when the customer user device reaches the target location. The product purchase link may enable a customer to purchase a limited edition product.

16 Claims, 6 Drawing Sheets

(56) References Cited

U.S. PATENT DOCUMENTS

| | | | | |
|---|---|---|---|---|
| 11,915,288 | B2* | 2/2024 | Clark | G06Q 30/0625 |
| 11,991,226 | B2* | 5/2024 | La Barrie | G06Q 20/326 |
| 12,277,586 | B2* | 4/2025 | Kaehler | G06Q 30/0283 |
| 2002/0026388 | A1 | 2/2002 | Roebuck | |
| 2013/0311329 | A1* | 11/2013 | Knudson | G06Q 30/0639 |
| | | | | 705/26.9 |
| 2014/0236775 | A1* | 8/2014 | Gill | G06Q 30/0643 |
| | | | | 705/27.2 |
| 2015/0262208 | A1* | 9/2015 | Bjontegard | G06Q 30/0205 |
| | | | | 705/7.31 |
| 2016/0140532 | A1* | 5/2016 | Kliper | G06Q 20/202 |
| | | | | 705/21 |
| 2016/0148304 | A1* | 5/2016 | Srinath | G06Q 30/0641 |
| | | | | 705/27.1 |
| 2016/0335688 | A1* | 11/2016 | Wang | G06Q 20/363 |
| 2017/0039613 | A1* | 2/2017 | Kaehler | G06Q 30/0643 |
| 2017/0235459 | A1* | 8/2017 | Cowles | G06F 3/04845 |
| | | | | 715/753 |
| 2018/0345129 | A1* | 12/2018 | Rathod | H04W 4/029 |
| 2018/0349703 | A1* | 12/2018 | Rathod | H04L 67/535 |
| 2019/0080342 | A1* | 3/2019 | Andon | A63F 13/212 |
| 2019/0108578 | A1* | 4/2019 | Spivack | G09B 5/065 |
| 2019/0130471 | A1* | 5/2019 | DePizzol | G06Q 30/0641 |
| 2019/0244436 | A1* | 8/2019 | Stansell | G06F 3/011 |
| 2019/0311368 | A1* | 10/2019 | Kim | H04W 4/023 |
| 2019/0325498 | A1* | 10/2019 | Clark | G06Q 30/0643 |
| 2020/0202419 | A1* | 6/2020 | Beauchamp | G06Q 30/0623 |
| 2021/0201029 | A1* | 7/2021 | Ju | G06Q 20/12 |
| 2021/0319499 | A1* | 10/2021 | Afaq | G06Q 30/0639 |
| 2022/0005095 | A1* | 1/2022 | Kaehler | G02B 27/0172 |
| 2022/0222741 | A1* | 7/2022 | Beauchamp | G06T 19/006 |
| 2022/0383401 | A1* | 12/2022 | Bronicki | G06Q 30/0639 |
| 2023/0230138 | A1* | 7/2023 | Collas | G06Q 20/322 |
| | | | | 705/26.25 |
| 2023/0260203 | A1* | 8/2023 | Maschmeyer | G06V 20/20 |
| | | | | 345/419 |
| 2024/0104537 | A1* | 3/2024 | Khandelwal | G06Q 20/206 |
| 2025/0086690 | A1* | 3/2025 | Wechsler | G06Q 30/0609 |

FOREIGN PATENT DOCUMENTS

| | | |
|---|---|---|
| EP | 3528194 A1 | 8/2019 |
| TW | 201814615 A | 4/2018 |

* cited by examiner

AUGMENTED REALITY SHOPPING SYSTEM

TECHNICAL FIELD

The present disclosure relates to an augmented reality (AR) shopping system, and more particularly, to an AR shopping system that facilitates purchase of limited edition products in a gamified shopping environment.

BACKGROUND

There is typically a huge demand for exclusive limited-edition products, e.g., celebrity endorsed clothing items, footwear, ornamental items, and/or the like. Such products are manufactured in limited numbers, and hence customers usually prefer to purchase them as soon as they are launched. Manufacturers and distributors of limited edition products sell the products either through retail stores or online via e-commerce platforms.

There may be instances where the limited edition products may be sold out online within a few minutes of being launched. This may cause inconvenience to the customers, as the customers may be required to make the purchase within a very short time duration. Further, there are known instances of misuse of online shopping for such products where a few malicious users use online robots (e.g., bots) to quickly purchase available products within a few seconds. This may leave legitimate retail customers with minimal or no opportunity to purchase the products. Since a human (e.g., a legitimate retail customer) cannot match the speed at which a bot may make an online purchase, the malicious users who use such bots may gain unfair advantage over the retail customers in purchasing limited edition products.

Thus, there exists a need in the industry for a system that facilitates online purchase of limited edition products, and minimizes or eliminates probability of usage of bots in purchasing such products.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
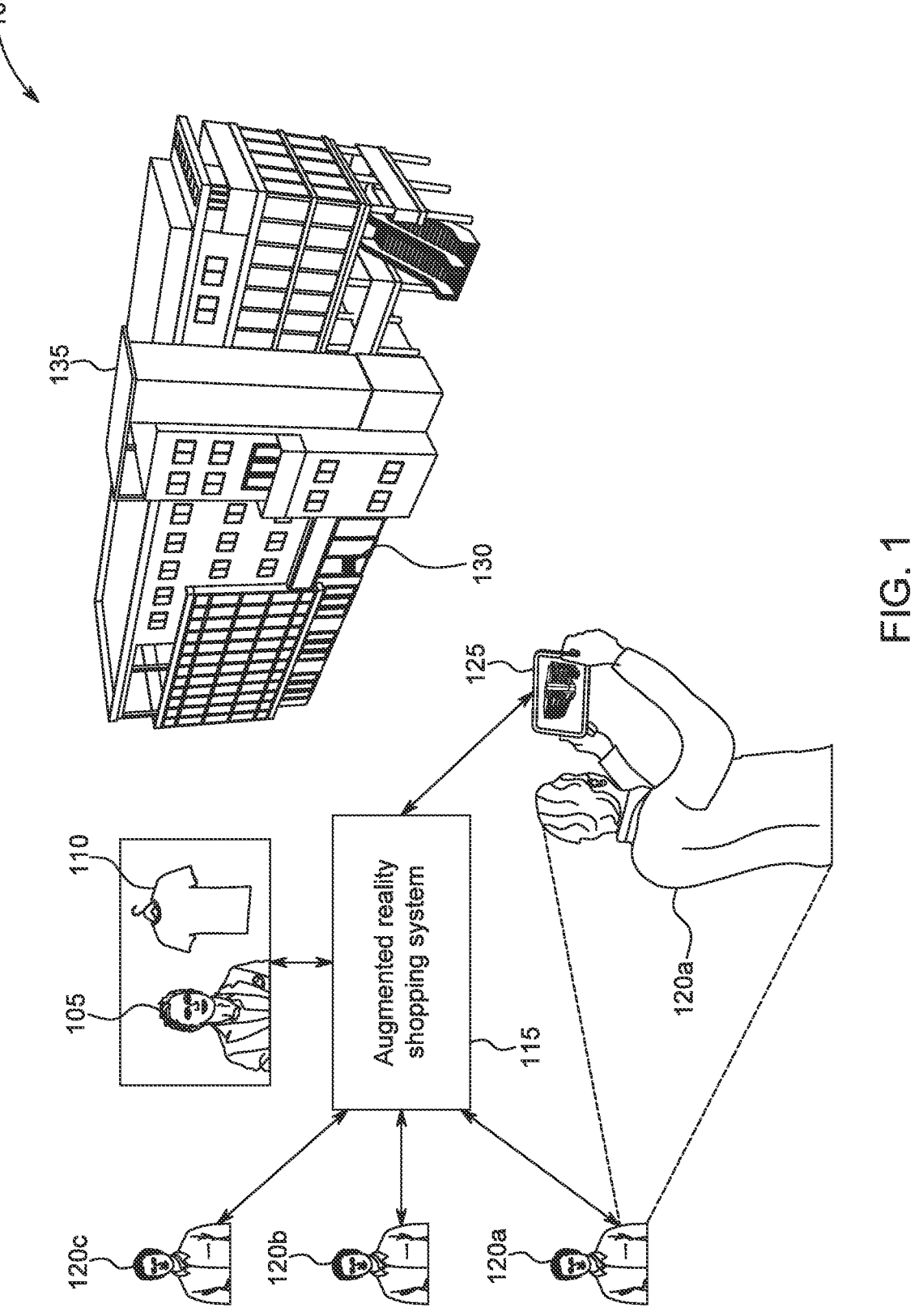
FIG. 1 depicts an example environment in which techniques and structures for providing the systems and methods disclosed herein may be implemented.

The present disclosure describes an Augmented Reality (AR) shopping system and method to facilitate shopping of limited edition products. The system may provide a gamified shopping environment to customers, using which the customers may purchase the limited edition products. A product manufacturer or distributor may place one or more virtual objects in a public place, e.g., a park, a museum, a mall, a parking lot, and/or the like. The virtual object may be associated with a known geolocation (e.g., location of a known museum, park, etc.), logo, signage at a store, Quick-Response (QR) code, etc. that may be disposed at the public place. The product distributor may transmit information associated with a virtual object location (e.g., a target location) where the product distributor may have placed the virtual object to the system, via a distributor user device. The product distributor may further transmit additional information, e.g., information associated with the virtual object, geolocation, images of the logo/store signage, product launch date and time, product 3D images, product pricing, etc., to the system via the distributor user device. Responsive to receiving the information and the target location, the system may store the received information in a system memory.

At the product launch date and time, the system may generate a virtual map of a geographical area including the public place, and may transmit the virtual map to a plurality of customer user devices that may be communicatively coupled and registered with the system. The virtual map may include the target location where the product distributor may have placed the virtual object at the public place.

A customer user device may receive the virtual map, and navigate towards the target location. Stated another way, a customer associated with the customer user device may view the virtual map on the customer user device, and may start to physically move towards the target location. In some aspects, the system may provide step-by-step navigation instructions to the customer user device, and facilitate the customer in navigating towards the target location. In some aspects, the customer may capture real-world view by using customer user device camera, when the customer navigates towards the target location. The customer user device may transmit the captured real-world view in real-time to the system.

The system may determine that the customer may have reached the target location based on the obtained real-world view from the customer user device. Specifically, the system may determine that the customer may have reached the target location by detecting virtual object presence in the obtained real-world view. Responsive to determining that the customer may have reached the target location, the system may transmit a link to view product 3D images and/or a link to purchase the product to the customer user device. The customer may view product 3D images and/or purchase the product by using the links obtained from the system. In other aspects, the customer may view the product in 3D form by using or scanning an Augmented Reality (AR)

image of the virtual product located at the target location, without having to use the link described above. In addition, the customer may scan the AR image of the virtual product at the target location to purchase the product, instead of having to use the link described above.

In some aspects, the system may additionally check customer user device authenticity before transmitting the virtual map to the customer user device or enabling the customer to purchase the product. The system may check the customer user device authenticity by checking if the customer has already purchased the product in the past by using the same customer user device, or by checking if the customer and/or the customer user device are part of whitelisted customers and/or customer user devices allowed to purchase the product.

The present disclosure discloses a system and method to facilitate purchase of limited edition products. Since the customers are required to physically move towards the target location to purchase the products by using the system, probability of system misuse by using bots is greatly reduced. Further, the system checks user device authenticity before enabling the customers to purchase the product, thereby providing additional security from system misuse. Furthermore, the system provides a gamified environment for purchasing the product, which is different from conventional online shopping environment.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a manufacturer or a distributor 105 who may sell limited edition products 110, e.g., limited edition clothing items, footwear items, electronics items, ornamental items, and/or the like. The limited edition products 110 may be those products that may be manufactured in limited numbers (e.g., less than 1,000, 5,000 or 10,000) and/or may be sold for a limited time duration (e.g., for 2 days, 7 days, 15 days, 1 month or 1 quarter).

The distributor 105 may sell the limited edition products 110 (or products 110) online by using an augmented reality (AR) shopping system 115 (or system 115). The distributor 105 may be connected with the system 115 via a distributor user device (shown as distributor user device 202 in FIG. 2) and a network (shown as network 204 in FIG. 2). The system 115 may be hosted on a server or a distributed computing system (not shown), and may enable a plurality to customers 120a, 120b, 120c (collectively referred to as plurality of customers 120) to access the system 115 and have an opportunity to purchase the products 110. The plurality of customers 120 may be connected to the system 115 via respective customer user devices 125 and the network. In some aspects, the plurality of customers 120 may be registered with the system 115 to receive notifications associated with the products 110, e.g., product launch date, process to purchase the products 110, process to make payment, and/or the like.

The system 115 may provide an AR or a gamified shopping environment, using which the plurality of customers 120 may get a fair and unbiased opportunity to purchase the products 110 online, and system misuse (e.g., by using bots) may be reduced or eliminated. An exemplary system operation is described below.

In some aspects, the distributor 105 may dispose/place (or "assign") one or more virtual objects associated with the products 110 in (or "to") one or more physical locations in a geographical area before launching the products 110. For example, the distributor 105 may place a virtual object 130 in a public place 135, e.g., a park, a library, a museum, a public building (hereinafter referred to as building 135), and/or the like. In an exemplary aspect, the virtual object 130 may be or may be associated with known geolocation (e.g., location of a known museum, park, etc.), logo, signage at a store, a street name, an address, a geographical landmark, Quick-Response (QR) code, and/or the like. In some aspects, the virtual object 130 may be or may be associated with any distinguishing aspect or feature of a physical geographic place. For example, the virtual object 130 may be associated with a well-known signage of a retail store, or a lamppost located in a central location of a park, a known geolocation, and/or the like.

Responsive to the distributor 105 placing the virtual object 130 in the building 135, the distributor 105 may transmit, via the distributor user device, information associated with a location (e.g., a target location) in the building 135 where distributor 105 may have placed the virtual object 130 to the system 115. The distributor 105 may further transmit, via the distributor user device, additional information associated with the virtual object 130 and/or the products 110 to the system 115. The additional information may include, but is not limited to, information associated with the known geolocation, image of the logo, signage, and/or the like (if the virtual object 130 is a logo, signage, etc.), product launch date and time, product pricing, product 3-Dimensional (3D) views, QR code (if the virtual object 130 is a QR code), etc.

Figure 2:
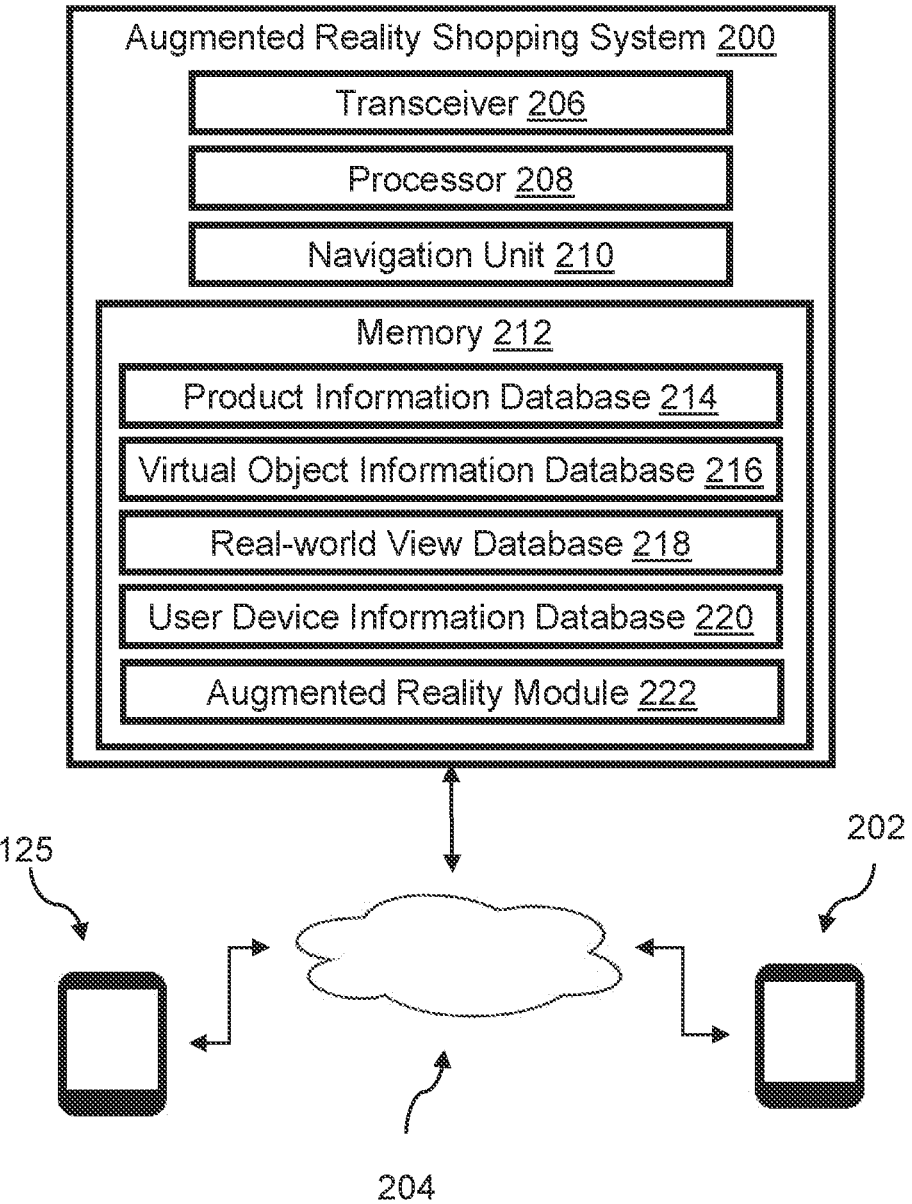
FIG. 2 depicts a block diagram of an example augmented reality shopping system to facilitate shopping of limited edition products in accordance with the present disclosure.

Responsive to receiving the information described above from the distributor user device, the system 115 may store the information in a system memory (shown as memory 212 in FIG. 2). At the product launch date and time, the system 115 may receive a trigger signal from the distributor user device or an internal system timer (not shown). Responsive to receiving the trigger signal, the system 115 may generate a virtual map of a geographical area including the building 135, and may transmit the virtual map to the customer user devices 125. The virtual map may include a virtual object location (or the target location) in the building 135. In some aspects, the system 115 may transmit the virtual map to the customer user device 125 responsive to receiving a request from the customer user device 125 to obtain the virtual map.

Figure 3:
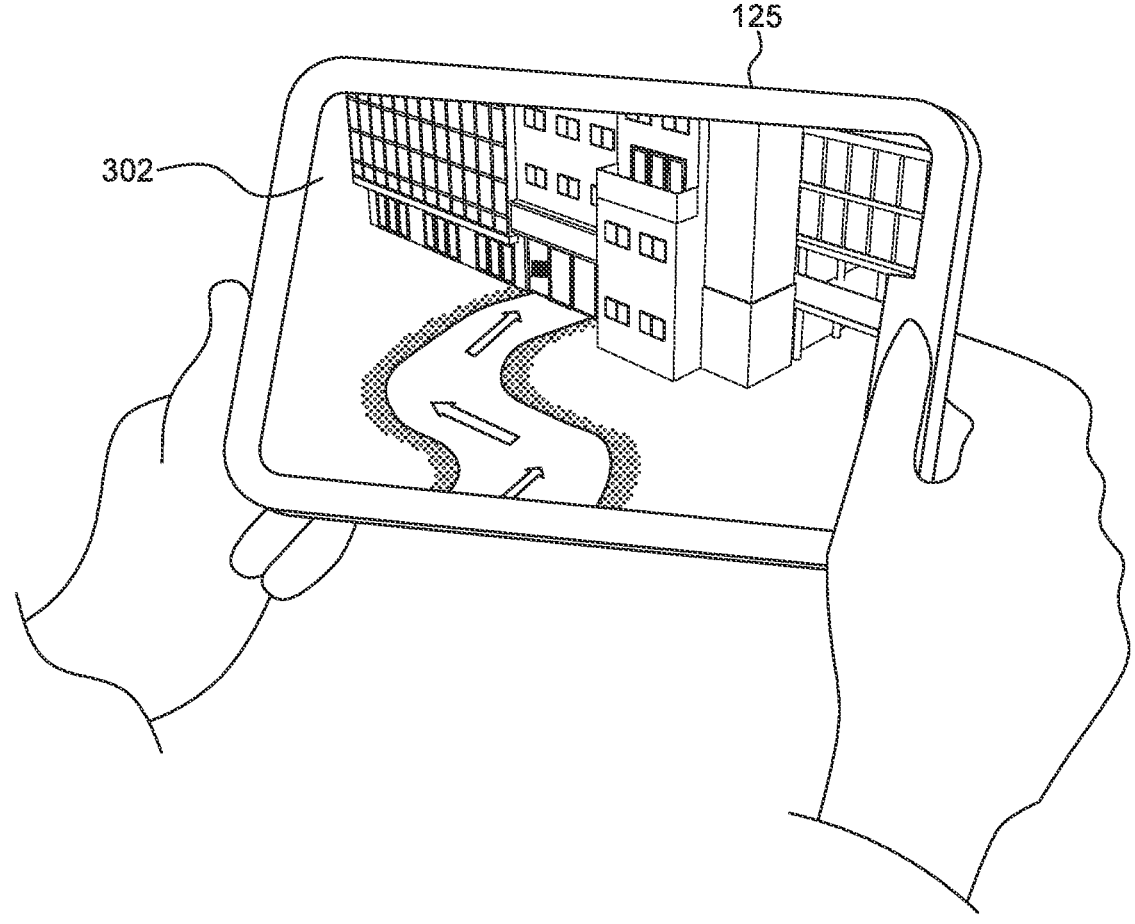
FIG. 3 depicts a first example snapshot of a customer user device display screen in accordance with the present disclosure.

The customer user device 125 may receive the virtual map, and the customer (e.g., the customer 120a) may physically move towards the target location in the building 135. In some aspects, the system 115 may assist the customer 120a in navigating towards the target location via the customer user device 125. The system 115 may assist the customer 120a in navigating towards the target location by displaying augmented reality (AR) "arrows" or direction pointers (as shown in FIG. 3) on the display screen of the customer user device 125. The customer 120a may capture real-world view of the building 135 or the geographical area including the building 135 by using a customer user device camera when the customer 120a navigates towards the target location. The customer 120a may transmit the captured real-world view to the system 115 in real-time via the customer user device 125.

The system 115 may continuously (or at a predefined frequency) monitor the received real-world view, and determine whether the customer 120a may have reached the target location. In some aspects, the system 115 may determine that the customer 120a may have reached the target location by determining whether the virtual object 130 is visible in the received real-world view. Stated another way, the system 115 may determine whether the customer 120a may have reached the target location by detecting virtual object presence in the received real-world view, as described below.

In some aspects, when the virtual object 130 is a QR code, the customer user device 125 may scan the virtual object 130 by using the customer user device camera when the customer 120a reaches the target location, and may transmit a scan information to the system 115. The system 115 may compare the received scan information with the information associated with the QR code stored in the system memory to ascertain whether the customer 120a has reached the target location. For example, the system 115 may determine that the customer 120a may have reached the target location when the received scan information matches with the information associated with the QR code stored in the system memory. On the other hand, the system 115 may transmit an error notification to the customer user device 125 when the received scan information does not match with the information associated with the QR code stored in the system memory. The customer 120a may continue to move towards the target location or may physically search the target location in the building 135 when the customer user device 125 receives the error notification from the system 115.

The present disclosed is not limited to the virtual object 130 being the OR code. In other aspects, when the virtual object 130 is associated with a known geolocation, the system 115 may determine that the customer 120a may have reached the target location when a real-time geolocation of the customer user device 125 matches with the known geolocation. In yet another aspect, when the virtual object 130 is associated with a logo, signage, and/or the like, the customer user device 125 may scan the virtual object 130 and the system 115 may compare image of the logo, signage, etc. in the received real-world view/scan with the image of the logo, signage, and/or the like, stored in the system memory to determine/ascertain whether the customer 120a has reached the target location. The system 115 may transmit the error notification to the customer user device 125 when the image in the real-world view does not match with the image(s) stored in the system memory. On the other hand, the system 115 may determine that the customer 120a may have reached the target location when the image in the real-world view matches with the image(s) stored in the system memory.

Responsive to determining that the customer 120a may have reached the target location, the system 115 may generate an AR image by overlaying a virtual product icon at the target location in the received real-world view. For example, if the product 110 is a T-shirt, the system 115 may overlay a virtual icon of a T-shirt at the target location in the received real-world view. The system 115 may transmit the generated AR image to the customer user device 125 and render the AR image with the virtual icon on a customer user device display screen. Rendering of the AR image with the virtual icon may indicate to the customer 120a that the system 115 may have recognized that the customer 120a has successfully reached the target location.

The customer 120a may scan the AR image/virtual icon at the target location to view the product 110 from 360 degree angle. In some aspects, the customer 120a may physically walk around the AR image/virtual icon to view the product 110 from 360 degree angle. In some aspects, the customer 120a may also purchase the product 110 (or send a purchase request to the system 115) by scanning the AR image/virtual icon.

In other aspects, the customer 120a may click the virtual icon on the AR image to activate one or more features associated with the virtual icon and/or the product 110. For example, by clicking on the virtual icon, the customer 120a may view product 3D images or purchase the product 110 on the system 115 (or via a third party payment platform accessible via the system 115).

A person ordinarily skilled in the art may appreciate from the description above that the system 115 facilitates the customers 120 to purchase the product 110 by physically moving towards the target location. Since online robots or bots may not replicate manual action of physically moving from one place to another, the system 115 ensures that online robots or bots do not purchase the products 110, and the products 110 may be purchased by legitimate (human) customers.

In some aspects, the system 115 may remove the target location from the virtual map (e.g., disable or remove virtual object presence from the virtual map) when the product 110 may have been purchased more than a predefined count of times (e.g., 2 to 10 times) by using the virtual object 130 placed at the target location or when product inventory may be sold out.

In additional aspects, to further secure the system 115 from misuse, the system 115 may check customer user device authenticity before generating the virtual map including the target location and transmitting the virtual map to the customer user device 125. The system 115 may check the customer user device authenticity by, e.g., checking whether the customer user device 125 may have purchased the product 110 historically more than a predefined count of purchase times (e.g., 2 or 3 times). In other aspects, the system 115 may check customer user device authenticity by determining whether the customer user device 125 is a blacklisted customer user device (or not part of a list of whitelisted customer user devices that may be pre-stored in the system memory). The customer user device 125 may be a blacklisted customer user device when, e.g., the customer user device 125 may have attempted to misuse the system 115 in the past or historically.

In some aspects, the system 115 may enable a plurality of customers scan the same virtual product at the same target location. Stated another way, the same virtual product may be scanned multiple times/by multiple customers. In further aspects, the system 115 may control a count of times a single customer may scan a single virtual object. In an exemplary aspect, a single customer may be enabled to scan a single virtual object once. In other aspects, a single customer may be enabled to scan a single virtual object more than one time (e.g., based on demand of the product).

In some aspects, the customer 120 may also purchase the product 110 from an offline store associated with the system 115.

Functional details of the system 115 are described in detail in conjunction with FIG. 2.

FIG. 2 depicts a block diagram of an example augmented reality shopping system 200 (or system 200) to facilitate shopping of limited edition products (e.g., the products 110) in accordance with the present disclosure. The system 200 may be same as the system 115 described above in conjunction with FIG. 1. While describing FIG. 2, references may be made to FIGS. 3-5 that depict a first snapshot, a second snapshot, and a third snapshot respectively of a customer user device display screen (e.g., a display screen of the customer user device 125).

The system 200, as described herein, can be implemented in hardware, software (e.g., firmware), or a combination thereof. Further, the system 200 may be hosted on a server or a distributed computing system (not shown), as described above. The system 200 may communicatively couple with a distributor user device 202 and the customer user device 125 via a network 204. The distributor user device 202 and the customer user device 125 may be, for example, a mobile phone, a laptop, a computer, a tablet, or any similar device with communication capabilities. In some aspects, display screens of both the distributor user device 202 and the customer user device 125 may be configured to display or render AR images. Further, each of the distributor user device 202 and the customer user device 125 may have respective user device camera(s). In some aspects, the distributor user device 202 may be associated with the distributor 105.

Although FIG. 2 depicts the system 200 being communicatively coupled with one distributor user device and one customer user device, the system 200 may be coupled with a plurality of distributor user devices and customer user devices simultaneously via the network 204, without departing from the present disclosure scope.

The network 204 may be, for example, a communication infrastructure in which the connected devices discussed in various embodiments of this disclosure may communicate. The network 204 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The system 200 may include a plurality of units including, but not limited to, a transceiver 206, a processor 208, a navigation unit 210, and a memory 212. The transceiver 206 may be configured to receive/transmit data, notifications, information, images, videos, etc. from/to one or more external communication devices via the network 204. For example, the transceiver 206 may receive/transmit data, notifications, information, images, videos, etc. from/to the distributor user device 202, the customer user device 125, and one or more servers (not shown) that may be coupled with the system 200 via the network 204. The navigation unit 210 may be configured to generate virtual maps of one or more geographical areas and/or generate navigation instructions for assisting a customer (e.g., the customer 120a) navigate from one location to another. In some aspects, the navigation unit 210 may coordinate, via the transceiver 206, with an external navigation server or a Global Positioning System server (not shown) for generating the virtual maps and/or the navigation instructions.

The memory 212 may store programs in code and/or store data for performing various system operations in accordance with the present disclosure. Specifically, the processor 208 may be configured and/or programmed to execute computer-executable instructions stored in the memory 212 for performing various system functions in accordance with the disclosure. Consequently, the memory 212 may be used for storing code and/or data code and/or data for performing operations in accordance with the present disclosure.

In one or more aspects, the processor 208 may be disposed in communication with one or more memory devices (e.g., the memory 212 and/or one or more external databases (not shown in FIG. 2)). The memory 212 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 212 may be one example of a non-transitory computer-readable medium and may be used to store programs in code and/or to store data for performing various operations in accordance with the disclosure. The instructions in the memory 212 can include one or more separate programs, each of which can include an ordered listing of computer-executable instructions for implementing logical functions.

In further aspects, the memory 212 may include a plurality of databases and modules including, but not limited to, a product information database 214, a virtual object information database 216, a real-world view database 218, a user device information database 220, and an augmented reality module 222. The augmented reality module 222, as described herein, may be stored in the form of computer-executable instructions, and the processor 208 may be configured and/or programmed to execute the stored computer-executable instructions for performing system functions in accordance with the present disclosure. The functions of the plurality of databases are described in the description below.

In operation, the distributor 105 may place the virtual object 130 at the target location in the building 135 prior to launching the product 110, as described above in conjunction with FIG. 1. The distributor 105 may transmit, via the distributor user device 202 and the network 204, information associated with the target location to the transceiver 206. The transceiver 206 may receive the information associated with target location from the distributor user device 202, and store the received target location information in the virtual object information database 216. The transceiver 206 may also send the received target location information to the processor 208.

The distributor 105 may further transmit, via the distributor user device 202 and the network 204, information associated with the virtual object 130 and the product 110 to the transceiver 206, as described above. The transceiver 206 may receive the information associated with the virtual object 130 (e.g., information associated with the known geolocation, image of the logo, signage, QR code, and/or the like) from the distributor user device 202, and store the received virtual object information in the virtual object information database 216. Further, the transceiver 206 may receive the information associated with the product 110 (e.g., product launch date and time, product pricing, product 3-Dimensional views, etc.) from the distributor user device 202, and store the received product information in the product information database 214.

In some aspects, at the product launch date and time, the transceiver 206 may receive a trigger signal from the distributor user device 202. As described above, the trigger signal may be associated with the product launch, and may be an indication to the system 200 to enable or allow the customers 120 to purchase the product 110. In other aspects, the transceiver 206 may receive the trigger signal from an internal system timer (not shown) based on the product launch date and time stored in the product information database 214.

The transceiver 206 may send the received trigger signal to the processor 208. Responsive to obtaining the trigger signal, in some aspects, the processor 208 may initiate customer user device authentication of the customer user device 125. In some aspects, the processor 208 may perform the customer user device authentication by first obtaining credentials of the customer 120a and/or the customer user device 125 from the customer user device 125. In some aspects, customer credentials may include, for example, customer name, customer contact details, customer address, and/or the like. Customer user device credentials may include a unique identifier associated with the customer user device 125. Responsive to obtaining the customer credentials and/or the customer user device credentials, the processor 208 may check whether the customer 120a and/or the customer user device 125 may be a blacklisted customer and/or blacklisted a customer user device. In some aspects, a customer and/or a customer user device may be blacklisted when the customer and/or the customer user device may have attempted to misuse the system 200 in the past or historically. Alternatively, the processor 208 may check whether the customer 120a and/or the customer user device 125 may be part of a list of whitelisted customer and/or whitelisted customer user device credentials (who may be allowed to purchase the product 110). In some aspects, the list of whitelisted customer and/or customer user device credentials (or the list of blacklisted customers and/or customer user devices) may be pre-stored in the user device information database 220.

Responsive to obtaining the customer credentials and/or the customer user device credentials from the customer user device 125, the processor 208 may obtain the list of whitelisted customer and/or customer user device credentials from the user device information database 220. The processor 208 may then compare or match the received credentials with the list of whitelisted customer and/or customer user device credentials. The processor 208 may determine that the customer 120a and/or the customer user device 125 may be authentic (or allowed to purchase the product 110) when the received credentials match with at least one credentials included in the list of whitelisted customer and/or customer user device credentials.

In other aspects, the processor 208 may check the customer user device authentication by determining a count of historical purchases of the product 110 that may have been performed by using the customer user device 125. The processor 208 may compare the count of historical purchases with a predefined threshold (e.g., two or three) that may be pre-stored in the memory 212. In some aspects, the processor 208 may determine that the customer user device 125 may be authentic when the count of historical product purchases performed by using the customer user device 125 may be less than the predefined threshold. Stated another way, the processor 208 may not allow more than two or three purchases of the product 110 from the same customer user device, e.g., the customer user device 125. In this manner, the processor 208 may prevent system misuse.

Responsive to determining that the customer user device 125 may be authentic, the processor 208 may command the navigation unit 210 to generate the virtual map of a geographical area including the target location, as described above in conjunction with FIG. 1. The processor 208 may transmit, via the transceiver 206, the generated virtual map to the customer user device 125 when the navigation unit 210 generates the virtual map. Responsive to receiving the virtual map on the customer user device 125, the customer 120a may view the virtual map and may begin to physical move towards the target location.

In some aspects, the system 200 may navigate the customer 120a (specifically, the customer user device 125) to the target location when the customer user device 125 receives the virtual map. Specifically, the transceiver 206 may receive real-time customer user device geolocation from the customer user device 125. Responsive to receiving the real-time customer user device geolocation, the transceiver 206 may send the real-time customer user device geolocation to the processor 208. The processor 208 may command the navigation unit 210 to generate step-by-step navigation instructions for navigating the customer user device 125 from a user device current location to the target location. In some aspects, the processor 208 may transmit, via the transceiver 206, the generated step-by-step navigation instructions to the customer user device 125, so that the customer 120a may follow the instructions and reach to the target location.

In other aspects, when the customer 120a may be physically moving towards the target location (from the user device current location), the customer 120a may capture real-world view by using a customer user device camera (not shown), and may transmit the captured real-world view to the transceiver 206 in real-time. The transceiver 206 may send the received real-world view to the real-world view database 218 for storage purpose. In addition, the transceiver 206 may send the received real-world view to the processor 208. Responsive to obtaining the real-world view, the processor 208 may use instructions included in the augmented reality module 222 to generate an AR image by overlaying the step-by-step navigation instructions generated by the navigation unit 210 on the obtained real-world view. The processor 208 may then transmit, via the transceiver 206, the generated AR image to the customer user device 125, so that the customer 120a may follow the navigation instructions and reach to the target location. An exemplary view of a display screen 302 of the customer user device 125 is shown in FIG. 3. As shown in FIG. 3, the display screen 302 may display the generated AR image with the navigation instructions that may assist the customer 120a to reach to the target location. In some aspects, the processor 208 may cause the customer user device 125 to display augmented reality (AR) "arrows" or direction pointers (as shown in FIG. 3), which may enable the customer 120a to reach to the target location.

The customer 120a may navigate/move towards the target location by following the navigation instructions that may be displayed on the display screen 302. In some aspects, the customer user device 125 may continue to transmit the real-world view to the transceiver 206, as the customer 120a navigates towards the target location. Further, the transceiver 206 may continue to send the received real-world view to the processor 208 (and to the real-world view database 218) in real-time.

In some aspects, the processor 208 may be further configured to determine whether the customer 120a may have reached the target location based on the real-world view obtained from the transceiver 206 in real-time. Specifically, the processor 208 may determine that the customer 120a may have reached the target location by detecting virtual object presence in the obtained real-world view or by matching a real-time geolocation of the customer user device 125 with the known geolocation (e.g., when the virtual object is associated with a known geolocation), as described above in conjunction with FIG. 1. As described above, the processor 208 may detect the virtual object presence in the obtained real-world view by comparing the received scan information with the information associated with the QR code stored in the virtual object information database 216, when the virtual object 130 may be a QR code. Alternatively, the processor 208 may detect the virtual object presence in the obtained real-world view by comparing logo/signage image in the real-world view with the logo/signage image stored in the virtual object information database 216, when the virtual object 130 may be associated with a logo/signage. Since the process of determining whether the customer user device 125 has reached the target location is already described above in FIG. 1, the process is not described again here for the sake of conciseness and simplicity.

Figure 4:
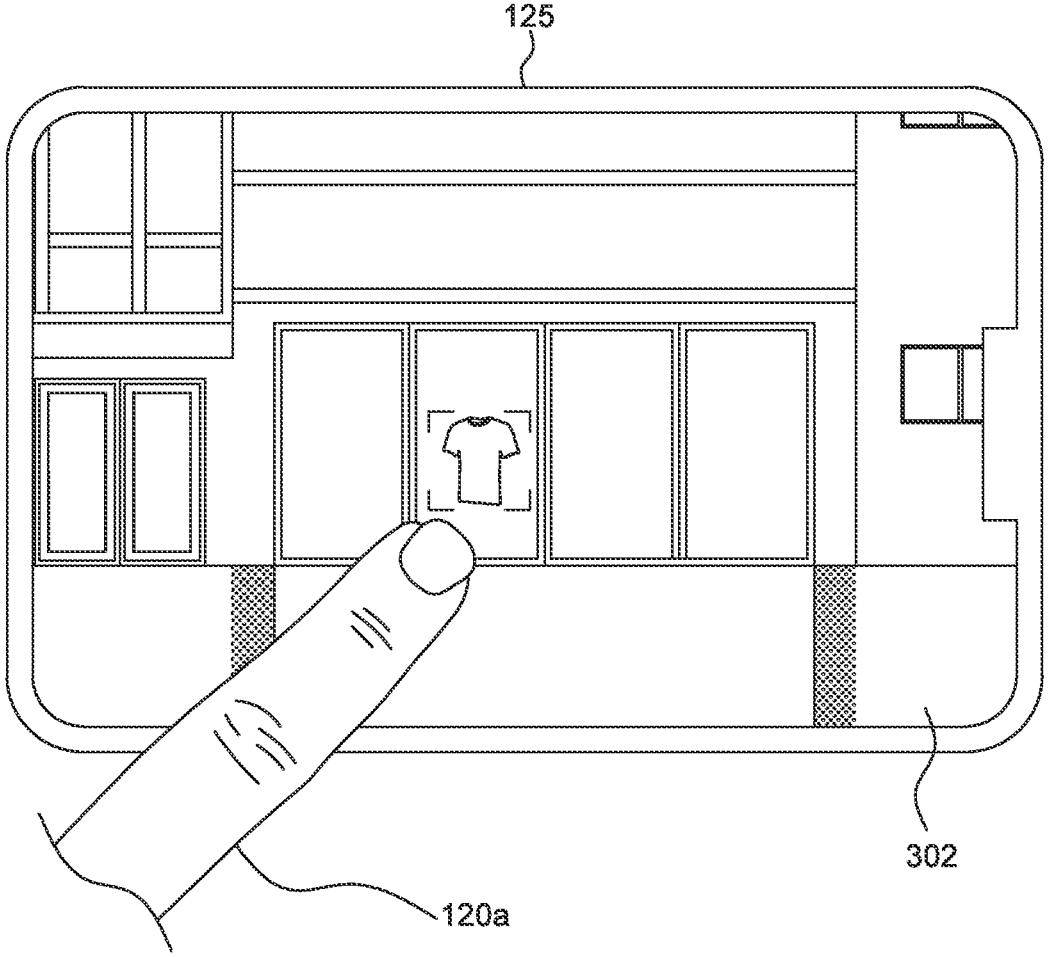
FIG. 4 depicts a second example snapshot of the customer user device display screen of FIG. 3 in accordance with the present disclosure.

Responsive to determining that the customer user device 125 (and hence the customer 120a) may have reached the target location, the processor 208 may use instructions stored in the augmented reality module 222 and generate an AR image by overlaying a virtual product icon on the obtained real-world view. In some aspects, the processor 208 may overlay the virtual product icon at the target location in the real-world view. The processor 208 may then transmit, via the transceiver 206, the generated AR image to the customer user device 125 and render the AR image on the display screen 302, as shown in FIG. 4. As shown in FIG. 4, a virtual icon of a T-shirt may be overlaid at the target location on the display screen 302, when the product 110 may be a T-shirt. In some aspects, rendering of T-shirt virtual icon on the display screen 302 may indicate to the customer 120a that the processor 208 may have recognized that the customer 120a has successfully reached the target location. A person ordinarily skilled in the art may appreciate that the T-shirt virtual icon depicted in FIG. 4 (and as described herein) is for illustrative purpose only, and virtual icon of any other shape, design, size, etc. may be rendered by the processor 208 on the display screen 302.

The customer 120a may scan the AR image/virtual icon of the T-shirt and/or click on the T-shirt virtual icon on the display screen 302. Responsive to the customer 120a scanning and/or clicking the T-shirt virtual icon, a product request signal may be transmitted from the customer user device 125 to the transceiver 206. The transceiver 206 may receive the product request signal and send the product request signal to the processor 208. Responsive to obtaining the product request signal, the processor 208 may use the instructions stored in the augmented reality module 222 and modify the AR image on the display screen 302. Specifically, the processor 208 may replace the T-shirt virtual icon with one or more additional icons or links. The additional icons or links may be a link to view 3D product images and/or a link to purchase the product 110. The processor 208 may then transmit, via the transceiver 206, the modified AR image to the customer user device 125, and render the modified AR image on the display screen 302 as shown in FIG. 5.

Figure 5:
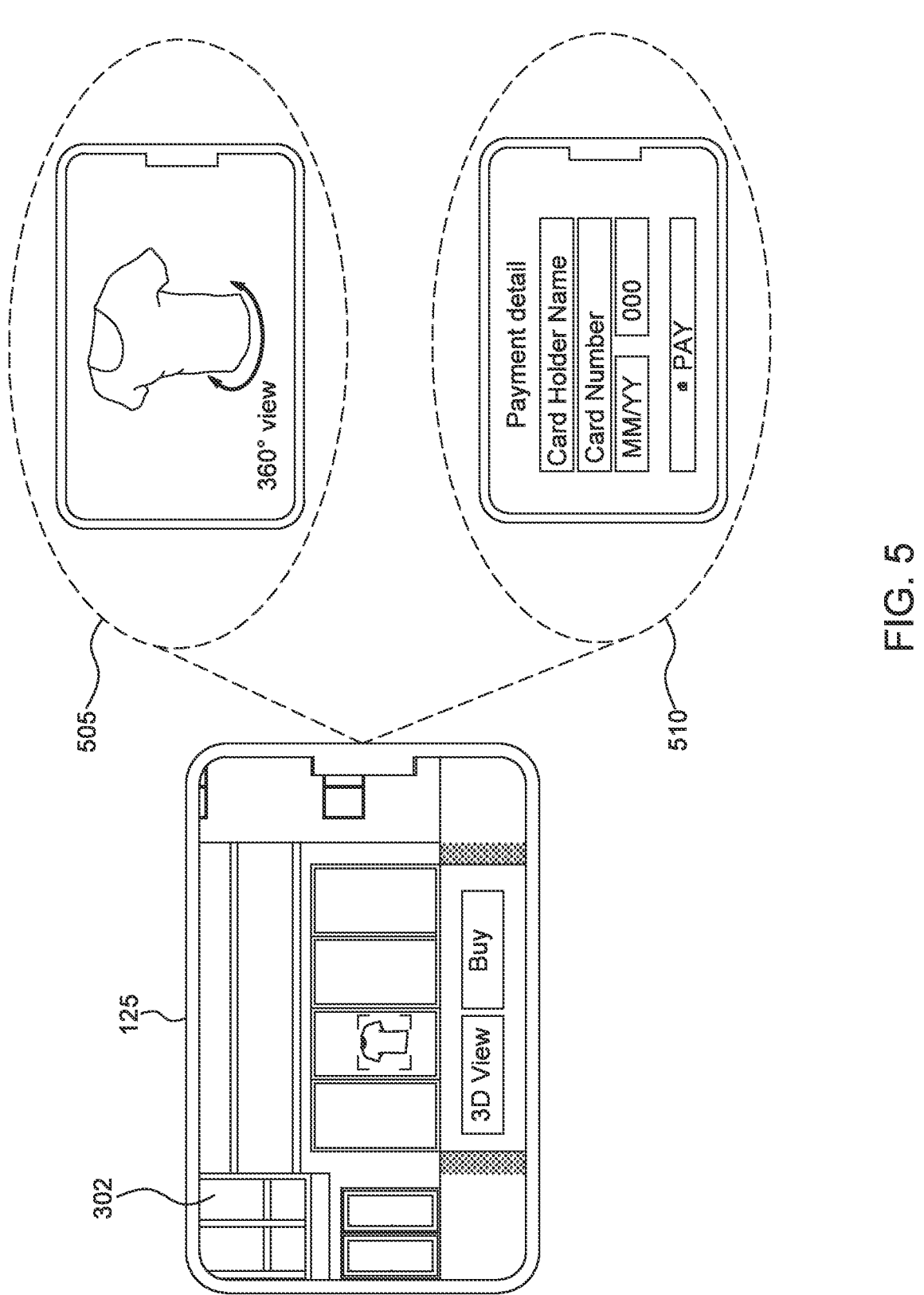
FIG. 5 depicts a third example snapshot of the customer user device display screen of FIG. 3 in accordance with the present disclosure.

The customer 120a may then click on the link to view 3D product images, to render 3D product view on the display screen 302 as shown in view 505 of FIG. 5. In addition or alternatively, the customer 120a may click on the link to purchase the product 110, to purchase the product 110 as shown in view 510 of FIG. 5. In some aspects, the customer 120a may purchase the product 110 on the system 200. In other aspects, when the customer 120a click on the link to purchase the product 110, the system 200 may redirect the display screen 302 to a third-party payment platform on which the customer 120a may make the payment and purchase the product 110.

In some aspects, the customer 120a may not be required to click the link to view the 3D product images and/or to purchase the product 110. Instead, the customer 120a may scan the AR image/virtual icon of the T-shirt to view its 3D form and/or the make the purchase. For example, the customer 120a may scan the virtual icon and physically move around the virtual icon to view the T-shirt from 360 degree angle.

The processor 208 may determine when the customer 120a makes the payment and purchases the product 110. Responsive to determining that the customer 120a may have purchased the product 110, in some aspects, the processor 208 may remove the target location from the virtual map. Stated another way, the target location of the virtual object 130 may not be visible to the customer 120a on the virtual map that may be displayed on the display screen 302, after the customer 120a purchases the product 110. In this manner, the processor 208 may ensure that the same customer, e.g., the customer 120a, does not purchase the product 110 again by using the same virtual object 130.

In additional aspects, the processor 208 may keep a track of product inventory, and make disable product purchase from the system 200 when the product 110 may be sold out. In this case, the processor 208 may remove virtual maps from all customer user devices 125 when the processor 208 determines that the product 110 may be sold out. In other aspects, product sale may be time-bound, e.g., for 1 week or 2 weeks. In this case, the processor 208 may disable product purchase from the system 200 when the corresponding sale time duration may elapse.

Figure 6:
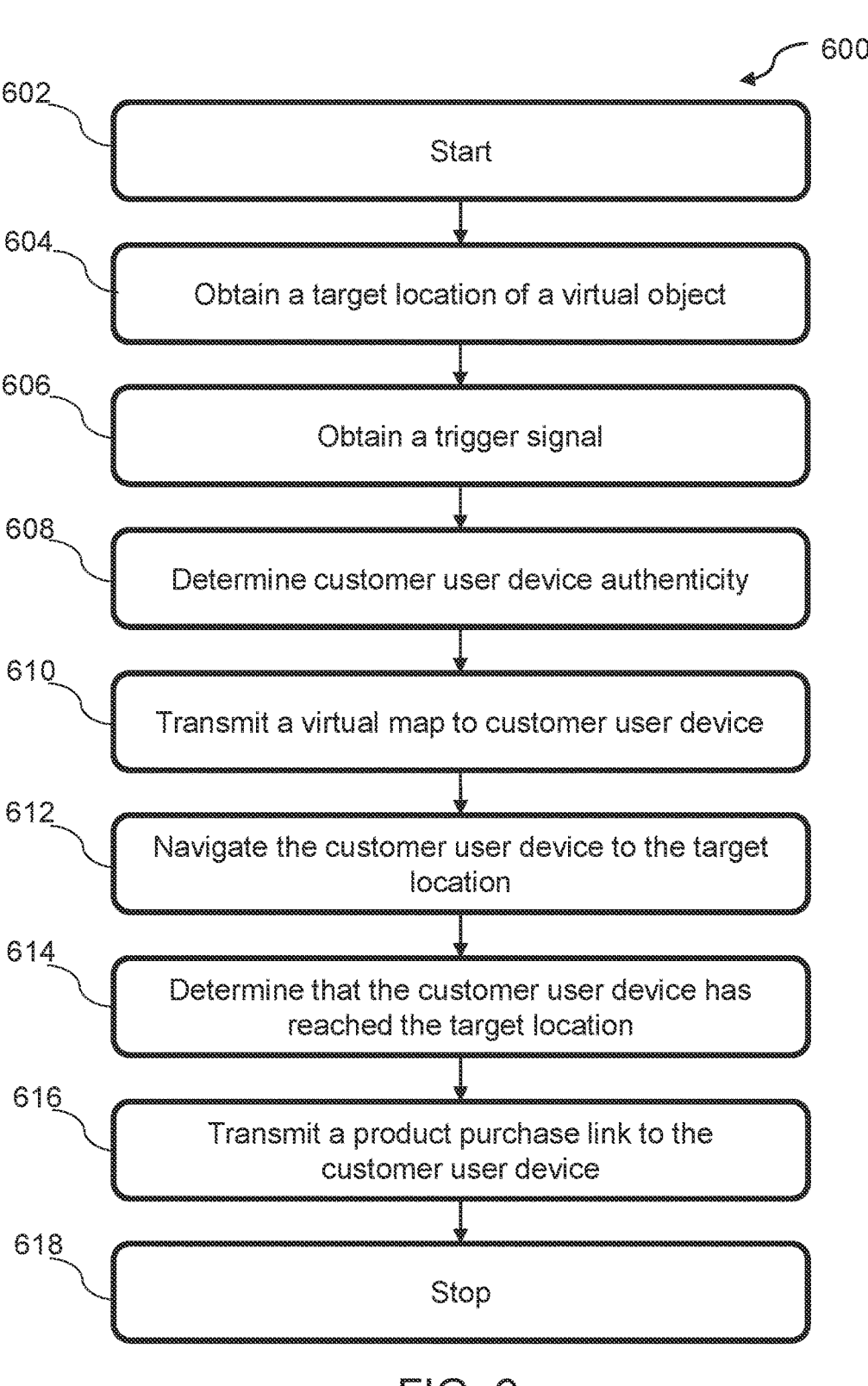
FIG. 6 depicts a flow diagram of an example method to facilitate shopping of limited edition products in accordance with the present disclosure.

FIG. 6 depicts a flow diagram of an example method 600 to facilitate shopping of limited edition products in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the processor 208, a virtual object target location from the distributor user device 202. At step 606, the method 600 may include obtaining, by the processor 208, the trigger signal at the product launch date and time. As described above, the processor 208 may obtain the trigger signal from the distributor user device 202 or the internal system timer.

At step 608, the method 600 may include determining, by the processor 208, the customer user device authenticity responsive to obtaining the trigger signal. At step 610, the method 600 may include transmitting, by the processor 208, the virtual map including the target location to the customer user device 125, as described above.

At step 612, the method 600 may include navigating, by the processor 208, the customer user device 125 to the target location. At step 614, the method 600 may include determining, by the processor 208, that the customer user device 125 may have reached the target location. At step 616, the method 600 may include transmitting, by the processor 208, a product payment link to the customer user device 125, responsive to determining that the customer user device 125 may have reached the target location. The product purchase link may enable the customer 120*a* to purchase the product 110.

At step 618, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to facilitate shopping, the method comprising:
    obtaining, by a processor, a target location of a virtual object disposed in a geographical area from a distributer user device, wherein the virtual object is associated with a limited-edition product;
    obtaining, by the processor, a trigger signal from the distributer user device, wherein the trigger signal is associated with a limited-edition product launch;
    determining, by the processor, an authenticity of a customer user device responsive to obtaining the trigger signal, wherein determining the authenticity comprises:
        determining a count of historical purchases of the limited-edition product performed by a customer using the customer user device; and
        determining that the customer user device is authentic when the count of historical purchases is less than a predefined threshold;
    transmitting, by the processor, a virtual map comprising the target location to the customer user device responsive to a determination that the customer user device is authentic;
    obtaining, by the processor, a real-world view of the geographical area from the customer user device;
    displaying, by the processor, augmented reality direction pointers on the real-world view on the customer user device, to navigate the customer user device to the target location;
    detecting, by the processor, a presence of the virtual object in the real-world view;
    determining, by the processor, that the customer user device has reached the target location based on the presence of the virtual object in the real-world view; and
    transmitting, by the processor, a product purchase link to the customer user device responsive to a determination that the customer user device has reached the target location, wherein the product purchase link enables the customer to purchase the limited-edition product.

2. The method of claim 1 further comprising:
    obtaining a real-time customer user device geolocation;

navigating the customer user device to the target location based on the real-time customer user device geolocation;

obtaining the real-world view of the geographical area from the customer user device when the customer user device navigates from the real-time customer user device geolocation to the target location;

determining that the customer user device has reached the target location based on the real-world view;

generating an Augmented Reality (AR) image by overlaying a virtual icon associated with the limited-edition product on the real-world view responsive to a determination that the customer user device has reached the target location; and rendering the AR image on the customer user device.

3. The method of claim 2, wherein the virtual object is further associated with at least one of: a known geolocation, a logo, a street name, an address, and a geographical landmark.

4. The method of claim 2, wherein transmitting the product purchase link comprises transmitting the product purchase link when the customer clicks or scans the virtual icon on the AR image.

5. The method of claim 2 further comprising rendering a 3-Dimensional (3D) view of the limited-edition product on the customer user device when the customer clicks or scans the virtual icon on the AR image.

6. The method of claim 1, wherein determining the authenticity of the customer user device further comprises:

obtaining customer credentials from the customer user device;

obtaining a list of whitelisted customer credentials authorized to purchase the limited-edition product;

matching the customer credentials with the list of whitelisted customer credentials; and determining that the customer user device is authentic when the customer credentials match at least one whitelisted customer credentials from the list of whitelisted customer credentials.

7. The method of claim 1 further comprising:

determining that the customer has purchased the limited-edition product by using the product purchase link; and removing the target location from the virtual map responsive to a determination that the customer has purchased the limited-edition product by using the product purchase link.

8. The method of claim 1, wherein the limited-edition product is at least one of: a clothing item, a footwear item, an electronics item, and an ornamental item.

9. A system to facilitate shopping, the system comprising:

a transceiver configured to:

receive a target location of a virtual object disposed in a geographical area from a distributer user device, wherein the virtual object is associated with a limited-edition product; and receive a trigger signal from the distributer user device, wherein the trigger signal is associated with a limited-edition product launch;

a memory configured to store the target location and the trigger signal;

a processor communicatively coupled to the memory, the processor configured to:

obtain the target location and the trigger signal from the memory;

determine an authenticity of a customer user device responsive to obtaining the trigger signal, wherein the processor determines the authenticity by:

determining a count of historical purchases of the limited-edition product performed by a customer using the customer user device; and determining that the customer user device is authentic when the count of historical purchases is less than a predefined threshold;

transmit a virtual map comprising the target location to the customer user device responsive to a determination that the customer user device is authentic;

obtain a real-world view of the geographical area from the customer user device;

display augmented reality direction pointers on the real-world view on the customer user device, to navigate the customer user device to the target location;

detect a presence of the virtual object in the real-world view;

determine that the customer user device has reached the target location based on the presence of the virtual object in the real-world view; and transmit a product purchase link to the customer user device responsive to a determination that the customer user device has reached the target location, wherein the product purchase link enables the customer to purchase the limited-edition product.

10. The system of claim 9, wherein the processor is further configured to:

obtain a real-time customer user device geolocation;

navigate the customer user device to the target location based on the real-time customer user device geolocation;

obtain the real-world view of the geographical area from the customer user device when the customer user device navigates from the real-time customer user device geolocation to the target location;

determine that the customer user device has reached the target location based on the real-world view;

generate an Augmented Reality (AR) image by overlaying a virtual icon associated with the limited-edition product on the real-world view responsive to a determination that the customer user device has reached the target location; and render the AR image on the customer user device.

11. The system of claim 10, wherein the virtual object is further associated with at least one of: a known geolocation, a logo, a street name, an address, and a geographical landmark.

12. The system of claim 10, wherein the processor transmits the product purchase link when the customer clicks or scans the virtual icon on the AR image.

13. The system of claim 10, wherein the processor is further configured to render a 3-Dimensional (3D) view of the limited-edition product on the customer user device when the customer clicks or scans the virtual icon on the AR image.

14. The system of claim 9, wherein the processor further determines the authenticity of the customer user device by:

obtaining customer credentials from the customer user device;

obtaining a list of whitelisted customer credentials authorized to purchase the limited-edition product;

matching the customer credentials with the list of whitelisted customer credentials; and determining that the customer user device is authentic when the customer credentials match at least one whitelisted customer credentials from the list of whitelisted customer credentials.

15. The system of claim 9, wherein the processor is further configured to:

determine that the customer has purchased the limited-edition product by using the product purchase link; and remove the target location from the virtual map responsive to a determination that the customer has purchased the limited-edition product by using the product purchase link.

16. A non-transitory computer-readable storage medium in a distributed computing system, the non-transitory computer-readable storage medium having instructions stored thereupon which, when executed by a processor, cause the processor to:

obtain a target location of a virtual object disposed in a geographical area from a distributer user device, wherein the virtual object is associated with a limited-edition product;

obtain a trigger signal from the distributer user device, wherein the trigger signal is associated with a limited-edition product launch;

determine an authenticity of a customer user device responsive to obtaining the trigger signal, wherein the processor determines the authenticity by:

determining a count of historical purchases of the limited-edition product performed by a customer using the customer user device; and determining that the customer user device is authentic when the count of historical purchases is less than a predefined threshold;

transmit a virtual map comprising the target location to the customer user device responsive to a determination that the customer user device is authentic;

obtain a real-world view of the geographical area from the customer user device;

display augmented reality direction pointers on the real-world view on the customer user device, to navigate the customer user device to the target location;

detect a presence of the virtual object in the real-world view;

determine that the customer user device has reached the target location based on the presence of the virtual object in the real-world view; and transmit a product purchase link to the customer user device responsive to a determination that the customer user device has reached the target location, wherein the product purchase link enables the customer to purchase the limited-edition product.

* * * * *